June 10, 1930.  A. CRAIGON  1,762,611
FUEL INJECTION VALVE
Filed Nov. 21, 1927
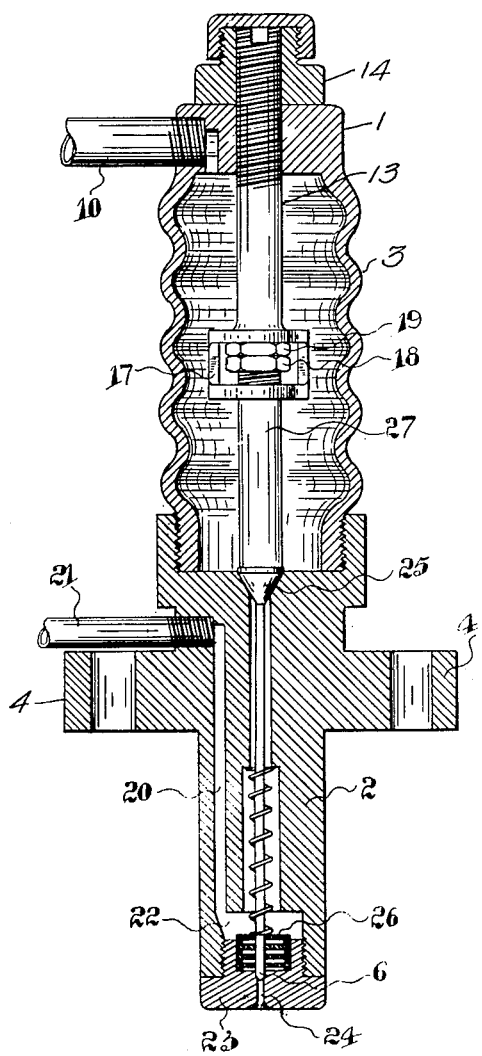
INVENTOR.
A. Craigon
BY J. Edward Maybee
ATTY.

Patented June 10, 1930

1,762,611

UNITED STATES PATENT OFFICE

ADAM CRAIGON, OF TORONTO, ONTARIO, CANADA, ASSIGNOR TO CRAIGON ENGINES LIMITED, OF HAMILTON, CANADA

FUEL-INJECTION VALVE

Application filed November 21, 1927. Serial No. 234,857.

This invention relates to valves used for the injection of fuel by means of an air blast under high pressure into the combustion chambers of internal combustion engines, and my object is to devise a valve which will dispense with the stuffing boxes, slide rods, rocker arms and external movable parts usually employed.

I attain my object by making part of the valve casing capable of elongation under high pressure, and by utilizing the movement so obtained to control the flow of air to open the outlet from the valve, whereby all parts movable in the operation of the valve may be enclosed in the valve casing.

The invention is hereinafter more specifically described and is illustrated in the accompanying drawing which is a longitudinal section of a valve constructed in accordance with my invention and arranged for air blast injection.

The valve casing comprises the ends 1 and 2 and an intermediate section 3, which may be coupled in any convenient manner.

The coupling of the end 2 preferably includes a flange 4, by means of which the valve may be secured to the combustion chamber of an internal combustion engine.

The intermediate section 3 is so constructed that under high internal fluid pressure it will elongate and thus further separate the ends 1 and 2. For this purpose it may be given a bellows-like form, as, for example, by forming it with a corrugated wall.

The end 2 is provided with the outlet 24 controlled by the valve plug 6. Preferably the outlet is formed in a nozzle 23 threaded into the end 2.

With the end 1 of the valve casing communicates the inlet pipe 10. With the valve plug 6 is connected a valve stem 27. Threaded through the end of the part 1 of the valve casing is a stem 13. Exteriorly of the end 1 a lock nut 14 is screwed on the stem. This lock nut, being closed at its outer end, serves also to prevent leakage round the stem 13.

The stems 27 and 13 are coupled so that movement of the valve stem 13 may be imparted to the valve stem 27, but the coupling includes a lost motion device whereby the valve stem 12 is only actuated after the stem 13 is moved a predetermined distance.

The coupling device shown in the drawings includes a cage 17 connected to the end of one stem into which the end of the other stem passes and is provided with a tappet 18 threaded on the end of the stem and provided with a lock nut 19. The position of the tappet relative to the bottom of the cage is thus easily adjusted to provide for any desired amount of lost motion.

The inlet pipe 10 will be connected with a source of supply of compressed air. The end 2 of the valve casing, in addition to the central passage, is also provided with a passage 20, with which communicates the fuel pipe 21. The passage 22 forms a communication between the central passage and the passage 20 of the end 2. The stem 27 is also provided with a valve plug 25 controlling the flow of air through the inner end of the central passage of the part 2. When sufficient air pressure is admitted into the interior of the valve casing, the air outlet and the fuel outlet are simultaneously opened and the fuel supplied through the pipe 21 ejected. The amount of fuel ejected depends, of course, as usual, on the control of the quantity supplied. The usual atomizing disks 26 are provided in the nozzle 23.

From the construction described it will be seen that there are no movable parts required externally of the valve casing, and thus stuffing boxes and other connections liable to leakage are eliminated.

What I claim as my invention is:

A fuel injection valve comprising a casing having a fuel outlet, an inlet for liquid fuel, an inlet for compressed air and separate passages leading from the inlets to the outlet, a part of the casing being adapted to elongate when the air pressure in the casing is sufficiently high; a valve plug controlling the outlet; a valve plug controlling the compressed air passage; and connections whereby the movement of elongation effects the opening of both valves.

Signed at Toronto this 11th day of November, 1927.

ADAM CRAIGON.